(12) United States Patent
Mizukami (10) Patent No.: US 9,368,149 B2
(45) Date of Patent: Jun. 14, 2016

(54) DISK DRIVE SPINDLE MOTOR WITH ADHESIVE CONNECTION BETWEEN SHAFT FLANGE AND BEARING CUP

(71) Applicant: Nidec Corporation, Kyoto (JP)

(72) Inventor: Junya Mizukami, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/524,171

(22) Filed: Oct. 27, 2014

(65) Prior Publication Data

US 2015/0236559 A1 Aug. 20, 2015

Related U.S. Application Data (60) Provisional application No. 61/941,014, filed on Feb. 18, 2014.

(51) Int. Cl.
| | | |
|---|---|---|
| *G11B 19/20* | (2006.01) | |
| *F16C 17/10* | (2006.01) | |
| *H02K 5/167* | (2006.01) | |
| *H02K 7/08* | (2006.01) | |
| *H02K 1/18* | (2006.01) | |
| *H02K 7/00* | (2006.01) | |

(52) U.S. Cl.
CPC .......... *G11B 19/2009* (2013.01); *F16C 17/107* (2013.01); *G11B 19/2036* (2013.01); *H02K 1/187* (2013.01); *H02K 5/1675* (2013.01); *H02K 5/1677* (2013.01); *H02K 7/003* (2013.01); *H02K 7/086* (2013.01); *F16C 2226/40* (2013.01)

(58) Field of Classification Search
None
See application file for complete search history.

(56) References Cited

U.S. PATENT DOCUMENTS

| | | | | |
|---|---|---|---|---|
| 5,528,436 | A | * | 6/1996 | Peter .......................... 360/99.08 |
| 7,982,349 | B2 | | 7/2011 | Popov et al. |
| 8,737,019 | B2 | | 5/2014 | Fuss |
| 2006/0002641 | A1 | * | 1/2006 | Ichiyama ...................... 384/100 |
| 2014/0147065 | A1 | * | 5/2014 | Sugiki ........................... 384/107 |

FOREIGN PATENT DOCUMENTS

| | | |
|---|---|---|
| DE | 10 2011 014 369 A1 | 9/2012 |
| DE | 10 2012 013 186 A1 | 1/2013 |
| DE | 10 2013 017 154 A1 | 4/2015 |
| JP | 2009-136143 A | 6/2009 |
| JP | 2010-164123 A | 7/2010 |

* cited by examiner

*Primary Examiner* — Craig A. Renner
(74) *Attorney, Agent, or Firm* — Keating & Bennett, LLP (57) ABSTRACT

In a motor, a lower thrust portion is defined by a flange portion extending radially outward from an outer circumferential surface of a shaft portion of a shaft and a plate portion extending radially inward from an inner circumferential surface of a cylindrical wall of a bearing cup portion which axially overlap with each other. The flange portion and the plate portion include a first adhesive portion radially opposed thereto and a second adhesive portion axially opposed thereto. An adhesive is located in each of the first adhesive portion and the second adhesive portion such that the shaft and the bearing cup portion have excellent bonding strength to withstand an axial load.

20 Claims, 8 Drawing Sheets

DISK DRIVE SPINDLE MOTOR WITH ADHESIVE CONNECTION BETWEEN SHAFT FLANGE AND BEARING CUP

BACKGROUND OF THE INVENTION

1. Field of the Invention

The present invention relates to an electric motor.

2. Description of the Related Art

Some known motors of disk drive apparatuses include bearing mechanisms using fluid dynamic pressure. A spindle motor disclosed in JP-A 2009-136143 includes a shaft, a first bearing component, a second bearing component, and a rotor component. The first bearing component is arranged in the shape of a cup, and includes an opening portion arranged to pass therethrough in an axial direction in a center thereof. A lower portion of the shaft is fitted in the opening portion of the first bearing component. The second bearing component is annular, and is defined integrally with the shaft at an upper end portion of the shaft. The rotor component is arranged in a middle space defined by the shaft, the first bearing component, and the second bearing component. A fluid dynamic pressure radial bearing portion is defined between a cylindrical surface of the rotor component and an outer circumferential surface of the shaft.

A fluid dynamic pressure thrust bearing portion is defined between a lower surface of the rotor component and a surface of the first bearing component which is axially opposed to the lower surface. A seal gap which extends upward is defined outside the fluid dynamic pressure thrust bearing portion. A pumping seal portion is defined between a lower surface of the second bearing component and a surface of the rotor component which is opposed to the lower surface. Another seal gap arranged to extend upward is defined outside the pumping seal portion.

In recent years, additional reductions in thickness and size have been demanded of disk drive apparatuses. In particular, in order to achieve an additional reduction in the thickness of a drive apparatus including a 2.5" disk, which is among small-sized disk drive apparatuses, it is necessary to reduce the thickness of a motor itself arranged inside a housing. A reduction in the thickness of the motor itself leads to a reduction in the axial dimension of a region over which different components are joined to each other. A reduction in the axial dimension of the region over which the different components are joined to each other may result in a reduction in strength with which the components are joined to each other, and the joint portion may be ruined as a result of a load or weight being imposed on the motor.

SUMMARY OF THE INVENTION

A motor according to a preferred embodiment of the present invention includes a stationary portion and a rotating portion. The stationary portion includes a base portion, a bearing cup portion, a shaft, and a stator. The rotating portion includes a sleeve portion, a rotor hub, and a rotor magnet. The shaft includes a shaft portion and a flange portion extending radially outward from an outer circumferential surface of the shaft portion. The sleeve portion includes a bearing hole configured to accommodate at least a portion of the shaft. The bearing cup portion includes a cylindrical wall surrounding an outer circumference of the sleeve portion, and a plate portion in a shape of a circular or annular plate and extending radially inward from an inner circumferential surface of the cylindrical wall. The flange portion includes a first flange surface which is a cylindrical surface extending in an axial direction and face radially outward, and a second flange surface which is a circular or annular surface extending radially from the first flange surface. The bearing cup portion includes a first plate surface which is a cylindrical surface extending in the axial direction and face radially inward, and a second plate surface which is a circular or annular surface extending radially from the first plate surface. The first flange surface and the first plate surface are positioned opposite to each other to define a first adhesive portion, the first adhesive portion including an adhesive arranged therein. The second flange surface and the second plate surface are positioned opposite to each other to define a second adhesive portion, the second adhesive portion including an adhesive arranged therein. The adhesive arranged in the first adhesive portion is configured to be continuous with the adhesive arranged in the second adhesive portion.

In the motor according to preferred embodiments of the present invention, a strength with which the shaft and another member joined to the shaft are axially fixed to each other is increased to prevent the joint portion from being ruined or negatively impacted by a load or weight imposed axially.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
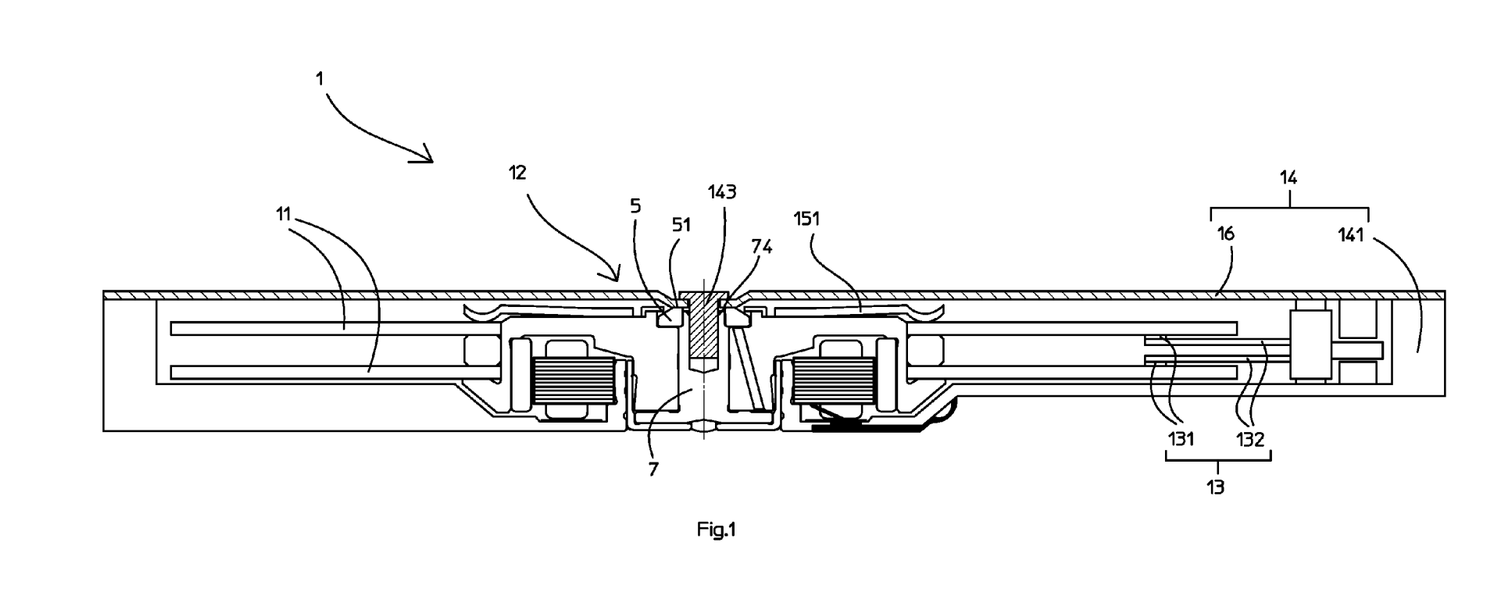
FIG. 1 is a schematic cross-sectional view of a disk drive apparatus according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a schematic cross-sectional view of a disk drive apparatus 1 including a spindle motor (hereinafter referred to simply as a "motor") 12 according to a first preferred embodiment of the present invention. The disk drive apparatus 1 is preferably a so-called hard disk drive. The disk drive apparatus 1 includes disks 11, the motor 12, an access portion 13, and an apparatus housing 14. The motor 12 is arranged to rotate the disks 11, on which information is recorded. The access portion 13 is arranged to perform at least one of reading and writing of information from or to each disk 11.

The apparatus housing 14 preferably includes a base portion 141 and a cover 16. The disks 11, the motor 12, and the access portion 13 are accommodated inside the base portion 141. The cover 16 is fitted to the base portion 141 to define the apparatus housing 14. An interior space of the disk drive apparatus 1 is preferably a clean space with no, or only an extremely small amount of, dirt or dust. According to the present preferred embodiment, a gas, such as, for example, air is present in the interior space of the disk drive apparatus 1. Note that the interior space of the disk drive apparatus 1 may also be filled with, for example, a helium gas or a hydrogen gas, or may alternatively be filled with a mixture of any of these gases and air.

The disks 11 are preferably clamped to the motor 12 through a clamper 151. The access portion 13 includes heads 131 and arms 132. Each of the heads 131 is arranged in close proximity to one of the disks 11 to magnetically perform at least one of the reading and the writing of information. Each of the arms 132 is arranged to support an associated one of the heads 131. Each of the arms 132 is moved to move an associated one of the heads 131 relative to an associated one of the disks 11. The above mechanism enables the head 131 to access a desired location on the rotating disk 11 with the head 131 being arranged in close proximity to the disk 11.

Figure 2:
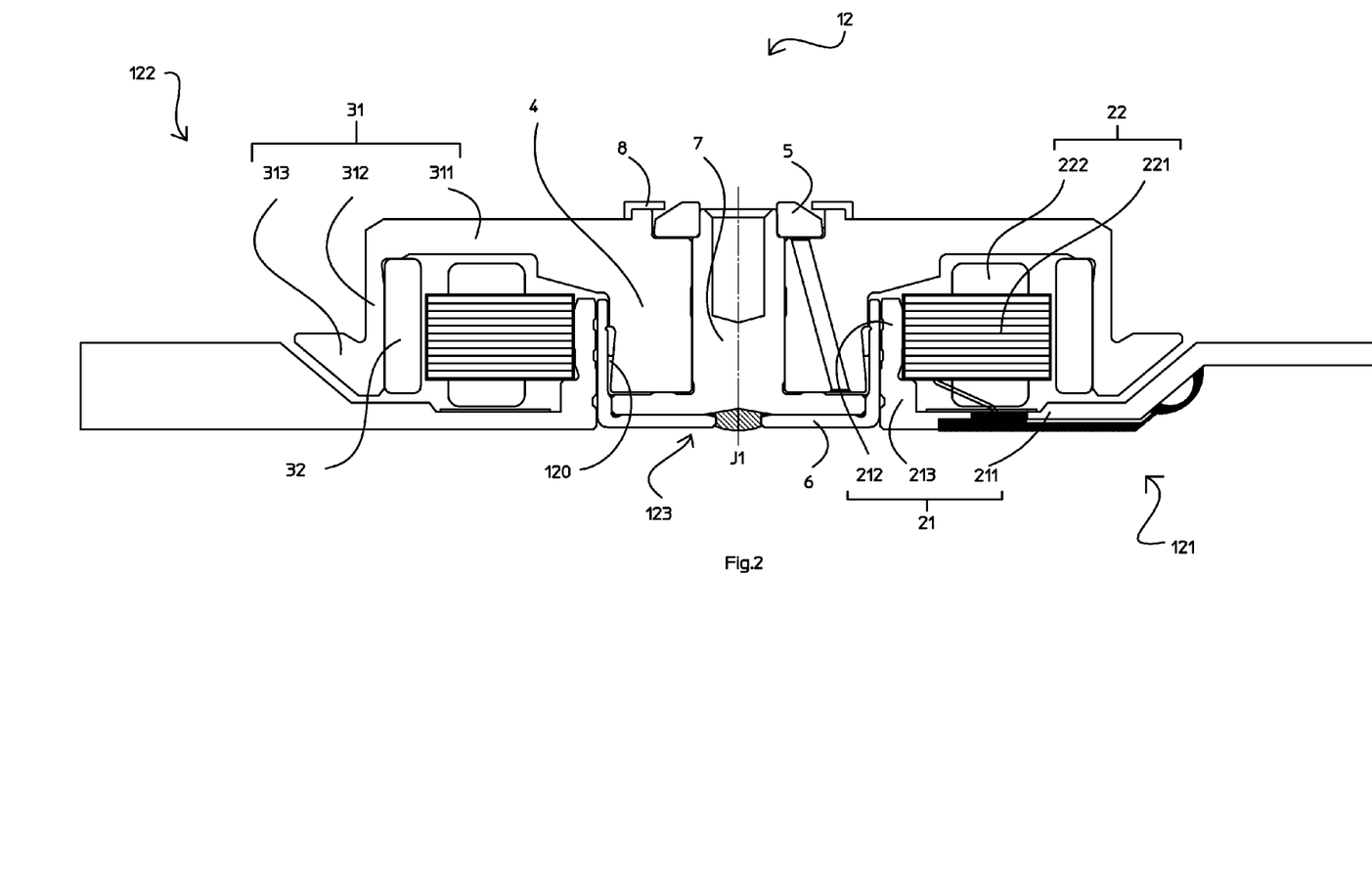
FIG. 2 is a schematic cross-sectional view of a motor according to the first preferred embodiment.

FIG. 2 is a schematic cross-sectional view of the motor 12. The motor 12 is preferably an outer-rotor motor, for example. The motor 12 includes a stationary portion 121, a rotating portion 122, and a bearing mechanism 123. The rotating portion 122 is supported to be rotatable about a central axis J1 of the motor 12 with respect to the stationary portion 121 through a lubricant 120.

The stationary portion 121 preferably includes a base plate 21 and a stator 22. The base plate 21 is preferably integrally defined as a single monolithic member together with the base portion 141 as illustrated in FIG. 1 to define a portion of the base portion 141. The base plate 21 preferably includes a bottom portion 211 and a stator fixing portion 212. The stator fixing portion 212 is cylindrical or substantially cylindrical, and is arranged to extend upward from an inner edge portion of the bottom portion 211. The stator fixing portion 212 preferably includes a shoulder portion 213. The shoulder portion 213 is arranged to project radially outward at a lower portion of the stator fixing portion 212 at a junction of the stator fixing portion 212 and the bottom portion 211. The bearing mechanism 123 is arranged inside the stator fixing portion 212. The stator 22 preferably includes a stator core 221 and coils 222. A conducting wire is selectively wound around different portions the stator core 221 to define each coil 222. A radially inner portion of the stator core 221 is fixed to an outer circumferential surface of the stator fixing portion 212. In addition, a lower surface of the radially inner portion of the stator core 221 is arranged to be in axial contact with an upper surface of the shoulder portion 213. The radially inner portion of the stator core 221 is preferably fixed to the outer circumferential surface of the stator fixing portion 212 through an adhesive and one of insertion fitting and press fitting, for example.

The rotating portion 122 preferably includes a rotor hub 31, a rotor magnet 32, and a sleeve portion 4. The rotor hub is a monolithic unitary member. The rotor hub 31 is preferably made of a metallic material, such as, for example, stainless steel or an aluminum alloy, and is preferably defined by a cutting process. The rotor hub 31 preferably includes a cover portion 311, a hub cylindrical portion 312, and a disk mount portion 313. The sleeve portion 4 defines a portion of the bearing mechanism 123. The cover portion 311 is arranged to extend radially outward from the sleeve portion 4. The hub cylindrical portion 312 is arranged to extend downward from an outer edge portion of the cover portion 311. The rotor magnet 32 is fixed to an inside of the hub cylindrical portion 312. The disk mount portion 313 is arranged to project radially outward from an outer circumferential surface of the hub cylindrical portion 312, and the disks 11 illustrated in FIG. 1 are arranged on an upper surface of the disk mount portion 313. The rotor magnet 32 is arranged radially opposite to the stator 22 with a gap intervening therebetween. A torque is produced between the stator 22 and the rotor magnet 32. A cap 8 is preferably arranged on an upper surface of the rotor hub 31. An inner end portion of the cap 8 is arranged above an upper plate 5 so as to overlap therewith in an axial direction. Note that the cap 8 may alternatively be arranged on the upper plate 5.

Figure 3:
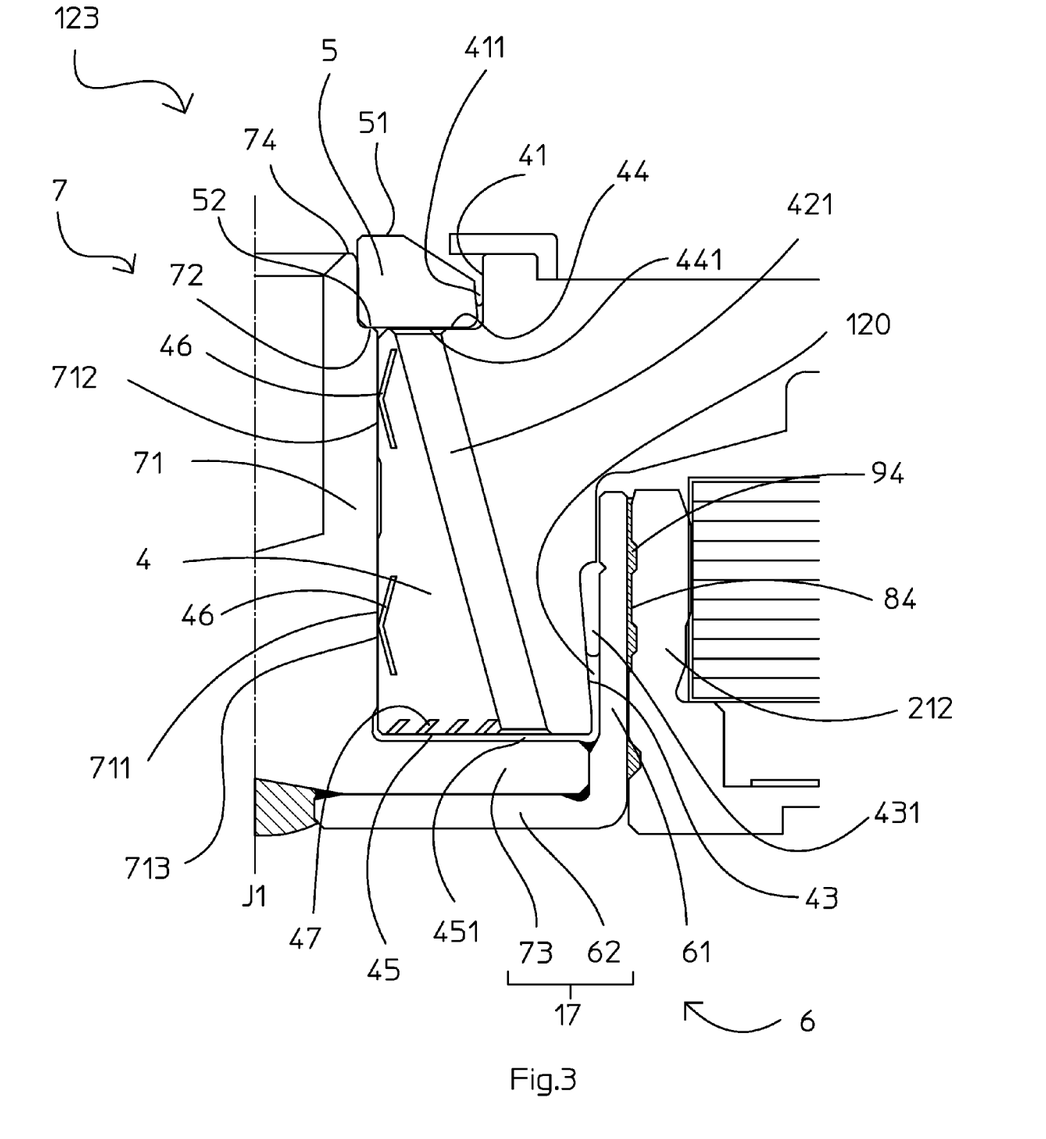
FIG. 3 is a schematic cross-sectional view of the motor according to the first preferred embodiment.

FIG. 3 is a diagram illustrating the bearing mechanism 123 in an enlarged form. The bearing mechanism 123 preferably includes the sleeve portion 4, the upper plate 5, a bearing cup portion 6, a shaft 7, and the lubricant 120. Each of the upper plate 5, the bearing cup portion 6, and the shaft 7 defines a portion of the stationary portion 121.

The sleeve portion 4 is arranged between the upper plate 5 and the bearing cup portion 6, and is arranged radially outside a shaft portion 71 of the shaft 7. The sleeve portion 4 is preferably cylindrical or substantially cylindrical and centered on the central axis J1, and includes a bearing hole arranged to accommodate at least a portion of the shaft 7. The sleeve portion 4 preferably includes a communicating hole 421 arranged to pass therethrough from an upper thrust surface 44 to a lower thrust surface 45 of the sleeve portion 4. The number of communicating holes 421 is one. Note, however, that two or more communicating holes 421 may be defined in the sleeve portion 4. Also note that it is possible to omit the communicating hole 421 if so desired. The same is true of other preferred embodiments of the present invention described below. An inner circumferential surface of the sleeve portion 4 is arranged opposite to an outer circumferential surface of the shaft portion 71 with a radial gap 711 intervening therebetween. In the radial gap 711, a first radial bearing portion 712 and a second radial bearing portion 713 are preferably defined such that the first and second radial bearing portions 712 and 713 are spaced from each other in an axial direction. At each of the first radial bearing portion 712 and the second radial bearing portion 713, a plurality of dynamic pressure grooves 46 are preferably defined in at least one of the inner circumferential surface of the sleeve portion 4 and the outer circumferential surface of the shaft portion 71. The dynamic pressure grooves 46 are arranged, for example, in a herringbone pattern. The lubricant 120 is arranged in the radial gap 711. Rotation of the sleeve portion 4 produces a dynamic pressure in the radial gap 711. Note that the lubricant 120 is preferably an oil. Also note that, although the plurality of dynamic pressure grooves 46 are arranged in the inner circumferential surface of the sleeve portion 4 in FIG. 3, this is not essential to the present invention, and that the plurality of dynamic pressure grooves 46 may be arranged in the outer circumferential surface of the shaft portion 71 instead of in the inner circumferential surface of the sleeve portion 4.

An upper portion of the shaft 7 preferably includes a shaft shoulder portion 72 configured to decrease in diameter relative to the outer circumferential surface of the shaft portion 71. The upper plate 5 is fixed to the upper portion of the shaft 7. A lower surface 52 of the upper plate 5 is arranged to be in contact with an upper surface of the shaft shoulder portion 72. The upper plate 5 is preferably fixed to the shaft 7 through, for example, insertion fitting, press fitting, or welding. Further, an adhesive may alternatively be used for this fixing. The shaft 7 preferably includes an annular or substantially annular flange portion 73 arranged to extend radially outward from the outer circumferential surface of the shaft portion 71. The shaft portion 71 and the flange portion 73 are preferably defined by a single monolithic member. The shaft 7 is preferably made of a material such as, for example, stainless steel, and is preferably defined by a cutting process and a grinding process. Note that the flange portion 73 may alternatively be defined by plastic deformation when the shaft 7 is still in a blank state before the cutting process or the grinding process is performed, if so desired. A reduction in the number of process steps is achieved by defining the flange portion 73 through plastic deformation as compared to the case where the flange portion 73 is defined by subjecting a bar material to a cutting process. Note that the shaft portion 71 and the flange portion 73 may also be defined by separate members.

Referring to FIG. 1, the shaft portion 71 preferably includes a screw hole into which a screw 143 is fitted. An upper surface 51 of the upper plate 5 is arranged at an axial level higher than that of an upper surface 74 of the shaft 7. The cover 16 is arranged to contact the upper surface 51 of the upper plate 5. The cover 16 and the shaft 7 are preferably fixed to each other through the screw 143. The lower surface 52 of the upper plate 5 is positioned to be in contact with the shaft shoulder portion 72, while the upper surface 51 of the upper plate 5 is positioned to be in contact with the cover 16. A change in the axial position of the upper plate 5 is thus prevented even when a region over which an inner circumferential surface of the upper plate 5 and the outer circumferential surface of the shaft portion 71 are joined to each other is relatively small.

The bearing cup portion 6 preferably includes a cylindrical wall 61 and a plate portion 62 in the shape of a circular or annular plate and arranged to extend radially inward from an inner circumferential surface of the cylindrical wall 61. An outer circumferential surface of the cylindrical wall 61 is arranged radially opposite to an inner circumferential surface of the stator fixing portion 212 with a gap intervening therebetween. An adhesive is preferably included in this gap. An upper surface of the plate portion 62 is arranged axially opposite to at least a portion of a lower surface of the flange portion 73 to define a lower thrust portion 17. The structure of the lower thrust portion 17 will be described below. The bearing cup portion 6 is preferably defined by a cutting process using a metallic material, such as, for example, stainless steel, an aluminum alloy, or a copper-based material. Note that the bearing cup portion 6 may be defined by press working, if so desired. Also note that the bearing cup portion 6 may be defined by an injection molding process using a resin material, such as, for example, a liquid crystal polymer (LCP). The bearing cup portion 6 is preferably made of a material having a coefficient of thermal expansion equivalent to that of the shaft 7. Note that, although the plate portion 62 and the cylindrical wall 61 are preferably defined by a single member, this is not essential to the present invention, and that the plate portion 62 and the cylindrical wall 61 may be defined by separate members.

The sleeve portion 4 preferably includes the upper thrust surface 44 and the lower thrust surface 45. The upper thrust surface 44 is arranged axially opposite to the lower surface 52 of the upper plate 5 with an upper thrust gap 441 intervening therebetween. The lower thrust surface 45 is arranged opposite to an upper surface of the flange portion 73 with a lower thrust gap 451 intervening therebetween. The communicating hole 421 preferably includes openings in both the upper thrust surface 44 and the lower thrust surface 45. An upper seal surface 41 is arranged at an outer edge portion of the upper thrust surface 44. The upper seal surface 41 is arranged to extend upward from the outer edge portion of the upper thrust surface 44. The upper seal surface 41 is arranged opposite to an outer circumferential surface of the upper plate 5 with an upper seal gap intervening therebetween. The width of the upper seal gap is preferably configured to decrease with decreasing distance from the upper thrust gap 441. The upper seal gap will be hereinafter referred to as an upper oil seal portion 411. A lower seal surface 43 is arranged at an outer edge portion of the lower thrust surface 45. The lower seal surface 43 is arranged to extend upward from the outer edge portion of the lower thrust surface 45. The lower seal surface is arranged opposite to an inner circumferential surface of the cylindrical wall 61 with a lower seal gap intervening therebetween. The width of the lower seal gap is preferably configured to decrease with decreasing distance from the lower thrust gap 451. The lower seal gap will be referred to as a lower oil seal portion 431.

The lubricant 120 is preferably arranged continuously, without an interruption, in the radial gap 711, the upper thrust gap 441, the lower thrust gap 451, the communicating hole 421, the upper oil seal portion 411, and the lower oil seal portion 431. In each of the upper oil seal portion 411 and the lower oil seal portion 431, a gas-liquid interface of the lubricant 120 is provided in a meniscus shape, and the lubricant 120 is retained by capillary action in each of the upper oil seal portion 411 and the lower oil seal portion 431.

At the lower thrust gap 451, a plurality of dynamic pressure grooves 47 are preferably defined in at least one of the lower thrust surface 45 and the upper surface of the flange portion 73. The dynamic pressure grooves 47 are preferably arranged, for example, in a spiral pattern. The rotation of the sleeve portion 4 produces a dynamic pressure in the lower thrust gap 451. Note that, although the plurality of dynamic pressure grooves 47 are preferably provided in the lower thrust surface 45 in FIG. 3, this is not essential to the present invention, and that the plurality of dynamic pressure grooves 47 may be provided in the upper surface of the flange portion 73 instead of in the lower thrust surface 45.

Figure 4:
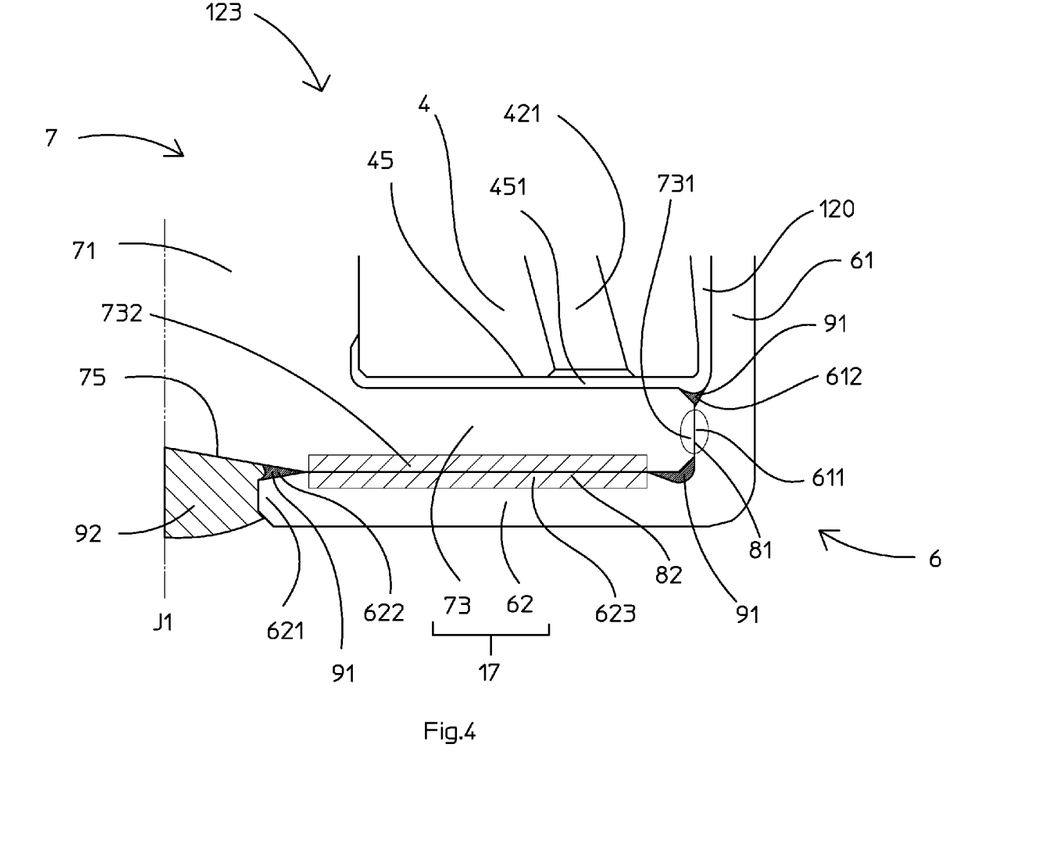
FIG. 4 is a schematic cross-sectional view illustrating a portion of a bearing mechanism according to the first preferred embodiment in an enlarged form.

FIG. 4 is a cross-sectional view illustrating the lower thrust portion 17 in an enlarged form. The flange portion 73 is positioned above the plate portion 62. The flange portion 73 preferably includes a first flange surface 731 and a second flange surface 732. The second flange surface 732 is positioned above the plate portion 62. The first flange surface 731 is positioned at an outer end portion of the flange portion 73, and is fitted to a first plate surface 611. The first flange surface 731 is preferably a cylindrical surface arranged to extend in the axial direction and face radially outward. The first plate surface 611 is preferably a cylindrical surface arranged opposite to the first flange surface 731, and arranged to extend in the axial direction and face radially inward. The term "to fit" as used above refers to a condition in which the first flange surface 731 is fitted to the first plate surface 611 through, for example, insertion fitting, press fitting, or shrink fitting. In the case of insertion fitting, a gap is arranged to intervene between the first flange surface 731 and the first plate surface 611. In the case of press fitting or shrink fit fitting, the first flange surface 731 and the first plate surface 611 are arranged to be in contact with each other. According to the present preferred embodiment, there is preferably no gap defined between the first flange surface 731 and the first plate surface 611. The absence of the gap contributes to reducing a displacement between a central axis of the shaft 7 and a central axis of the bearing cup portion 6.

A first adhesive 91 is preferably arranged in a region over which the first flange surface 731 and the first plate surface 611 are opposed to and fitted to each other. A portion of the fitting region where the first adhesive 91 is arranged will be hereinafter referred to as a first adhesive portion 81. A first tapered portion 612, the width of whose gap decreases with decreasing height, is preferably defined between the first flange surface 731 and the first plate surface 611. The first adhesive 91 is positioned in the first tapered portion 612, and the first adhesive 91 defines a meniscus in the first tapered portion 612. The first adhesive 91 is preferably arranged continuously in the first tapered portion 612 and the first adhesive portion 81. Connection between the first tapered portion 612 and the first adhesive portion 81 contributes to improving the strength with which the flange portion 73 and the bearing cup portion 6 are adhered to each other.

A second plate surface 623, which is the upper surface of the plate portion 62, is preferably arranged axially opposite to at least a portion of a second flange surface 732 to define the lower thrust portion 17. The second plate surface 623 is an annular surface arranged to extend radially inward from the first plate surface 611. The second flange surface 732 is an annular surface arranged to extend radially inward from the first flange surface 731. A second adhesive portion 82, in which the first adhesive 91 is arranged, is preferably positioned between the second plate surface 623 and the second flange surface 732. Note that the second plate surface 623 may be either arranged opposite to the second flange surface 732 while being in contact with the second flange surface 732, or arranged opposite to the second flange surface 732 with a gap intervening therebetween.

A second tapered portion 622 is preferably defined between an inner end portion 621 of the plate portion 62 and a shaft bottom portion 75 of the shaft 7. The shaft bottom portion 75 is a bottom portion of the shaft 7. The width of a gap of the second tapered portion 622 is preferably configured to decrease with increasing distance from the central axis J1. The first adhesive 91 is arranged in the second tapered portion 622, and the first adhesive 91 defines a meniscus in the second tapered portion 622. The first adhesive 91 is preferably provided continuously in the second tapered portion 622 and the second adhesive portion 82. Connection between the second tapered portion 622 and the second adhesive portion 82 preferably contributes to improving the strength with which the flange portion 73 and the bearing cup portion 6 are adhered to each other.

The first adhesive 91 is preferably arranged continuously, without an interruption, in the first tapered portion 612, the first adhesive portion 81, the second adhesive portion 82, and the second tapered portion 622. The first adhesive 91 is preferably, for example, a thermosetting epoxy adhesive. Note that the first adhesive 91 is not limited to the thermosetting epoxy adhesive. The strength with which the shaft 7 and the bearing cup portion 6 are joined to each other is improved by the first adhesive 91. Note that portions of the first adhesive 91 arranged in the first adhesive portion 81 and portions of the first adhesive 91 arranged in the second adhesive portion 82 may not necessarily be continuous with each other. Also note that portions of the first adhesive 91 arranged in the first tapered portion 612 and portions of the first adhesive 91 arranged in the first adhesive portion 81 may not necessarily be continuous with each other. Also note that portions of the first adhesive 91 arranged in the second tapered portion 622 and portions of the first adhesive 91 arranged in the second adhesive portion 82 may not necessarily be continuous with each other. Also note that portions of the first adhesive 91 arranged in the first adhesive portion 81 and portions of the first adhesive 91 arranged in the second adhesive portion 82 may be different types of adhesives. Also note that the second tapered portion 622 may alternatively be defined between an upper surface of the inner end portion 621 and the second flange surface 732.

In addition, the first adhesive 91 is able to prevent a leakage of the lubricant 120 arranged in the bearing mechanism 123. Tapered shapes of the first tapered portion 612 and the second tapered portion 622 allow the adhesive in a liquid state to penetrate into gaps of the first adhesive portion 81 and the second adhesive portion 82, respectively, through capillary forces. Then, the adhesive in the liquid state is heated to cure the adhesive, so that increased joining strength and oil sealing are achieved.

A through hole is preferably defined in a center of the plate portion 62. A second adhesive 92 is arranged radially inside the plate portion 62. The second adhesive 92 is located to be in contact with each of the inner end portion 621 and the shaft bottom portion 75. In addition, the second adhesive 92 is preferably arranged to cover the second tapered portion 622. The second adhesive 92 is preferably, for example, a thermosetting epoxy adhesive. Note that the second adhesive 92 is not limited to the thermosetting epoxy adhesive. A double oil seal structure is achieved by the second adhesive 92 covering the first adhesive 91, and oil sealing to prevent a leakage of the lubricant 120 is further improved. Note that the shaft bottom portion 75 and the inner end portion 621 may alternatively be joined to each other by welding instead of using the adhesive.

According to the present preferred embodiment, the plate portion 62 is configured to absorb and withstand an axial load below the flange portion 73. That is, the plate portion 62 and the flange portion 73 are preferably positioned to axially overlap with each other in a plan view to define the lower thrust portion 17. The strength with which the shaft 7 and the bearing cup portion 6 are fixed to each other is improved by the lower thrust portion 17 in addition to adhesive strength of the first adhesive portion 81 and the first tapered portion 612. In addition, a fourth adhesive portion 84, in which a fourth adhesive 94 is arranged, is preferably defined between the outer circumferential surface of the cylindrical wall 61 and the inner circumferential surface of the stator fixing portion 21. A load imposed by the rotating portion 122 is absorbed by the fourth adhesive portion 84 as well. The fourth adhesive portion 84 is preferably configured to have an axial dimension greater than the axial dimension of the first adhesive portion 81. Accordingly, the shaft 7 and the bearing cup portion 6 are able to obtain sufficient fixing strength to absorb and withstand the load imposed by the rotating portion 122.

Figure 5:
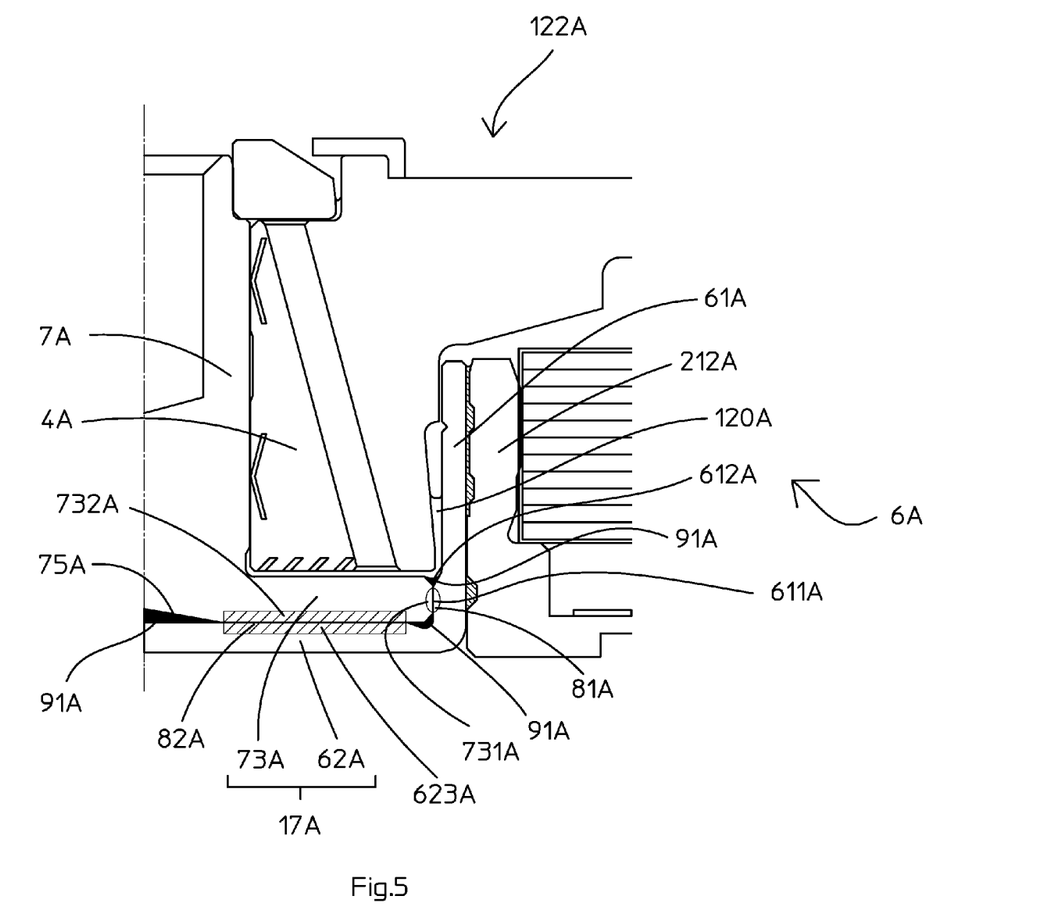
FIG. 5 is a schematic cross-sectional view of a bearing mechanism according to an example modification of the first preferred embodiment of the present invention.

Note that, although the through hole preferably is defined in the plate portion 62 according to the present preferred embodiment, this is not essential, and it is also possible to provide the plate portion 62 without any through holes. FIG. 5 is a cross-sectional view illustrating an example modification of the first preferred embodiment of the present invention. Because the example modification illustrated in FIG. 5 is similar in basic structure to the first preferred embodiment, the same reference characters as in the first preferred embodiment will be used in FIG. 5 except that an "A" will be added to the reference characters. The differences from the first preferred embodiment will be described below.

Referring to FIG. 5, a bearing cup portion 6A preferably includes a cylindrical wall 61A and a plate portion 62A. At least a portion of a second plate surface 623A, which is an upper surface of the plate portion 62A, is arranged axially opposite to a second flange surface 732A. A region over which the second plate surface 623A and the second flange surface 732A are axially opposed to each other will be referred to as a second adhesive portion 82A. Note that the second plate surface 623A may be either arranged opposite to the second flange surface 732A while being in contact with the second flange surface 732A, or arranged opposite to the second flange surface 732A with a gap intervening therebetween.

In addition, an outer circumferential surface of the cylindrical wall 61A is preferably arranged radially opposite to an inner circumferential surface of a stator fixing portion 212A with a gap intervening therebetween.

A first adhesive 91A is preferably arranged between the plate portion 62A and a shaft bottom portion 75A. The shaft bottom portion 75A is a bottom portion of a shaft 7A. This arrangement makes it possible to omit the second adhesive 92 according to the first preferred embodiment of the present invention. Accordingly, a leakage of a lubricant 120A through a gap between the shaft 7A and the bearing cup portion 6A is prevented.

Figure 6:
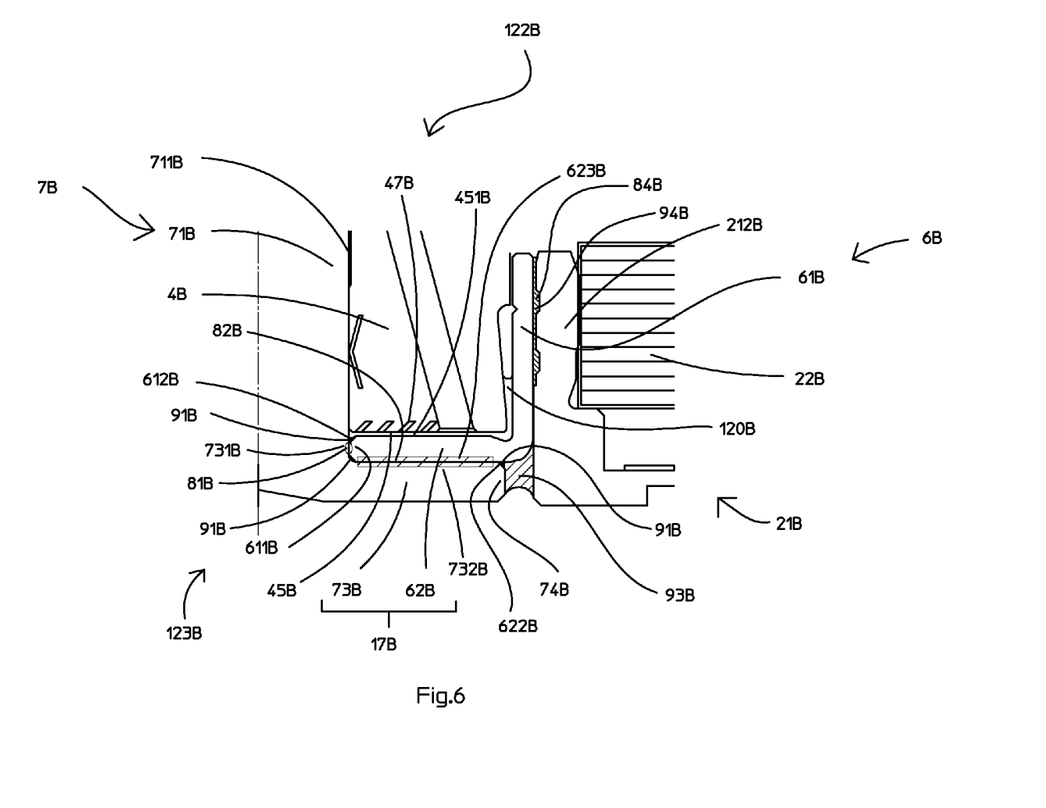
FIG. 6 is a schematic cross-sectional view of a bearing mechanism according to a second preferred embodiment of the present invention.

FIG. 6 is a diagram illustrating a lower thrust portion 17B according to a second preferred embodiment of the present invention. Because the second preferred embodiment illustrated in FIG. 6 is similar in basic structure to the first preferred embodiment, the same reference characters as in the first preferred embodiment will be used in FIG. 6 except that a "B" will be added to the reference characters. The differences from the first preferred embodiment will be described below.

A shaft 7B preferably includes an annular or substantially annular flange portion 73B and an outer end portion 74B. The flange portion 73B is arranged to extend radially outward beyond an outer circumferential surface of a shaft portion 71B. The outer end portion 74B is a radially outer end portion of the flange portion 73B. The shaft portion 71B and the flange portion 73B are preferably defined by a single monolithic member. Note that the shaft portion 71B and the flange portion 73B may alternatively be defined by separate members, if so desired. A bearing cup portion 6B includes a cylindrical wall 61B and a plate portion 62B in the shape of an annular plate and arranged to extend radially inward from the cylindrical wall 61B. The plate portion 62B is arranged above the flange portion 73B.

A first plate surface 611B of the plate portion 62B is fitted to a first flange surface 731B. The first plate surface 611B is a cylindrical surface included in the plate portion 62B, extending in the axial direction, and facing radially inward. The first flange surface 731B is a cylindrical surface arranged opposite to the first plate surface 611B, and arranged to extend in the axial direction and face radially outward. The term "to fit" as used above refers to a condition in which the first flange surface 731B is fitted to the first plate surface 611B through, for example, insertion fitting, press fitting, or shrink fitting. In the case of insertion fitting, a gap is positioned to intervene between the first flange surface 731B and the first plate surface 611B. In the case of press fitting or shrink fitting, the first flange surface 731B and the first plate surface 611B are arranged to be in contact with each other. According to the present preferred embodiment, there is preferably no gap defined between the first flange surface 731B and the first plate surface 611B. Absence of the gap contributes to reducing a displacement between a central axis of the shaft 7B and a central axis of the bearing cup portion 6B.

A first adhesive 91B is preferably positioned in a region over which the first flange surface 731B and the first plate surface 611B are opposed to and fitted to each other. A portion of the fitting region where the first adhesive 91B is located will be hereinafter referred to as a first adhesive portion 81B. A first tapered portion 612B, the width of whose gap decreases with decreasing height, is preferably defined between the first flange surface 731B and the first plate surface 611B. The first adhesive 91B is arranged in the first tapered portion 612B, and the first adhesive 91B defines a meniscus in the first tapered portion 612B. The first adhesive 91B is preferably arranged continuously in the first tapered portion 612B and the first adhesive portion 81B. Connection between the first tapered portion 612B and the first adhesive portion 81B contributes to improving strength with which the flange portion 73B and the bearing cup portion 6B are adhered to each other.

A second plate surface 623B, which is a lower surface of the plate portion 62B, is arranged axially opposite to at least a portion of a second flange surface 732B to define the lower thrust portion 17B. The second plate surface 623B is an annular surface arranged to extend radially from the first plate surface 611B. The second flange surface 732B is an annular surface arranged to extend radially from the first flange surface 731B. A second adhesive portion 82B, in which the first adhesive 91B is located, is positioned between the second plate surface 623B and the second flange surface 732B. Note that the second plate surface 623B may be either arranged opposite to the second flange surface 732B while being in contact with the second flange surface 732B, or arranged opposite to the second flange surface 732B with a gap intervening therebetween.

A second tapered portion 622B is preferably defined between the outer end portion 74B of the flange portion 73B and a bottom portion of the bearing cup portion 6B. The width of a gap of the second tapered portion 622B is arranged to decrease with decreasing distance from a central axis. The first adhesive 91B is located in the second tapered portion 622B. The first adhesive 91B defines a meniscus in the second tapered portion 622B. The first adhesive 91B is preferably positioned continuously in the second tapered portion 622B and the second adhesive portion 82B. Connection between the second tapered portion 622B and the second adhesive portion 82B contributes to improving strength with which the flange portion 73B and the bearing cup portion 6B are adhered to each other. Note that the second tapered portion 622B may be defined between the outer end portion 74B and a lower end portion of the cylindrical wall 61B.

The first adhesive 91B is preferably arranged continuously, without an interruption, in the first tapered portion 612B, the first adhesive portion 81B, the second adhesive portion 82B, and the second tapered portion 622B. The first adhesive 91B is preferably a thermosetting epoxy adhesive. Note that the first adhesive 91B is not limited to the thermosetting epoxy adhesive. Strength with which the shaft 7B and the bearing cup portion 6B are joined to each other is improved by the first adhesive 91B. Note that the first adhesive 91B arranged in the first adhesive portion 81B and the first adhesive 91B arranged in the second adhesive portion 82B may not necessarily be continuous with each other. Also note that the first adhesive 91B positioned in the first tapered portion 612B and the first adhesive 91B positioned in the first adhesive portion 81B may not necessarily be continuous with each other. Also note that the first adhesive 91B positioned in the second tapered portion 622B and the first adhesive 91B positioned in the second adhesive portion 82B may not necessarily be continuous with each other. Also note that the first adhesive 91B positioned in the first adhesive portion 81B and the first adhesive 91B positioned in the second adhesive portion 82B may be different types of adhesives.

In addition, the first adhesive 91B is preferably able to prevent a leakage of a lubricant 120B arranged in a bearing mechanism 123B. Tapered seal shapes of the first tapered portion 612B and the second tapered portion 622B allow the adhesive in a liquid state to penetrate into gaps of the first adhesive portion 81B and the second adhesive portion 82B, respectively, through capillary forces. Then, the adhesive in the liquid state is heated to cure the adhesive, so that increased joining strength and oil sealing are achieved.

A gap is preferably defined between the outer end portion 74B of the flange portion 73B and an inner circumferential surface of a stator fixing portion 212B. A third adhesive 93B is located in this gap. The third adhesive 93B is preferably positioned to be in contact with each of the outer end portion 74B and a bottom portion of the bearing cup portion 6B. In addition, the third adhesive 93B is preferably positioned to cover the second tapered portion 622B. Note that the third adhesive 93B may be arranged to be in contact with the inner circumferential surface of the stator fixing portion 212B. The third adhesive 93B is preferably a thermosetting epoxy adhesive. Note that the third adhesive 93B is not limited to the thermosetting epoxy adhesive. The third adhesive 93B may be arranged to have electrical conductivity. A double oil seal structure is preferably achieved by the third adhesive 93B covering the first adhesive 91B, and oil sealing to prevent a leakage of the lubricant 120B is further improved.

A lower thrust gap 451B is preferably defined between a lower thrust surface 45B, which is a lower surface of a sleeve portion 4B, and an upper surface of the plate portion 62B. The lubricant 120B is arranged in the lower thrust gap 451B. At least one of the lower thrust surface 45B and the upper surface of the plate portion 62B preferably includes a plurality of dynamic pressure grooves 47B. The dynamic pressure grooves 47B are arranged, for example, in a spiral pattern. Rotation of the sleeve portion 4B produces a dynamic pressure in the lower thrust gap 451B.

According to the present preferred embodiment, the flange portion 73B is preferably configured to absorb and withstand an axial load below the plate portion 62B. That is, the flange portion 73B and the plate portion 62B are positioned to axially overlap with each other in a plan view to define the lower thrust portion 17B. The strength with which the shaft 7B and the bearing cup portion 6B are fixed to each other is improved by the lower thrust portion 17B in addition to adhesive strength of the first adhesive portion 81B and the first tapered portion 612B. In addition, a fourth adhesive portion 84B, in which a fourth adhesive 94B is arranged, is preferably defined between an outer circumferential surface of the cylindrical wall 61B and the inner circumferential surface of the stator fixing portion 212B. A load imposed by a rotating portion 122B is absorbed by the fourth adhesive portion 84B as well. The fourth adhesive portion 84B is defined to have an axial dimension greater than the axial dimension of the first adhesive portion 81B. Accordingly, the shaft 7B and the bearing cup portion 6B are able to obtain sufficient fixing strength to absorb and withstand the load imposed by the rotating portion 122B.

Figure 7:
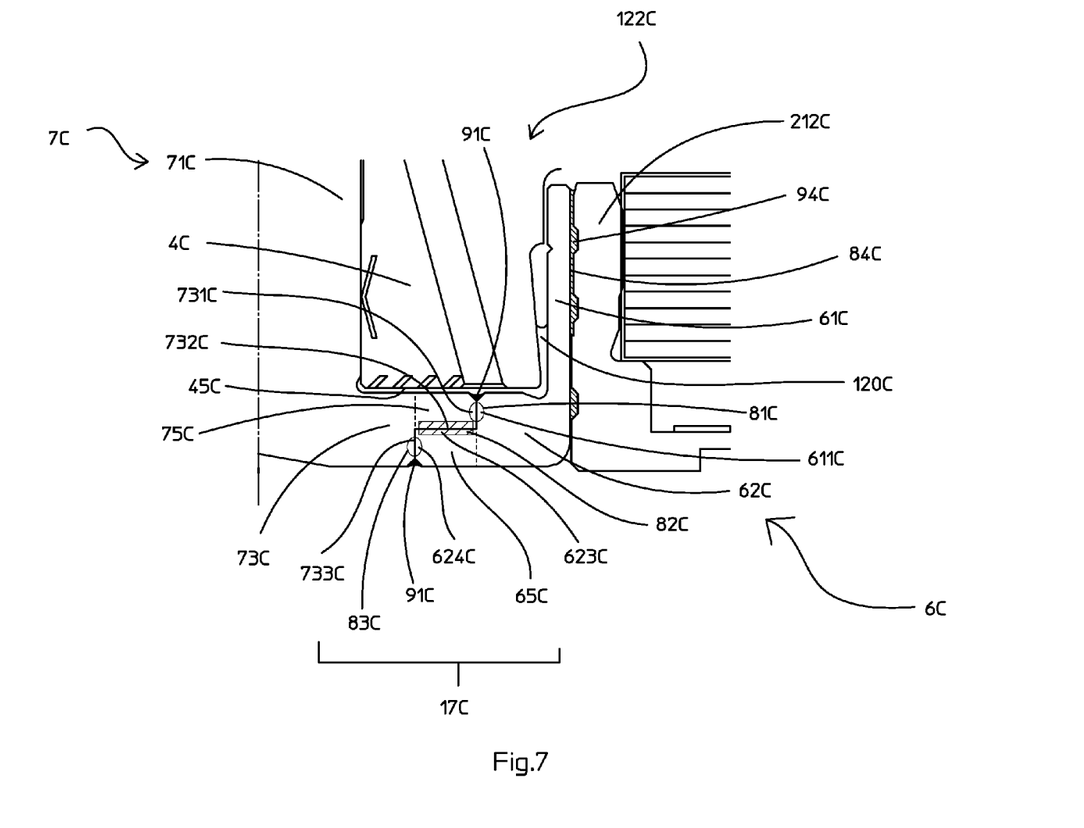
FIG. 7 is a schematic cross-sectional view of a bearing mechanism according to a third preferred embodiment of the present invention.

FIG. 7 is a diagram illustrating a lower thrust portion 17C according to a third preferred embodiment of the present invention. Because the third preferred embodiment illustrated in FIG. 7 is similar in basic structure to the first preferred embodiment, the same reference characters as in the first preferred embodiment will be used in FIG. 7 except that a "C" will be added to the reference characters. The differences from the first preferred embodiment will be described below. A shaft 7C includes an annular or substantially annular flange portion 73C configured to extend radially outward from an outer circumferential surface of a shaft portion 71C. The flange portion 73C preferably includes, at a radially outer end thereof, an annular flange projecting portion 75C having a decreased axial thickness. A bearing cup portion 6C preferably includes a cylindrical wall 61C and an annular or substantially annular plate portion 62C arranged to extend radially inward from the cylindrical wall 61C. The plate portion 62C preferably includes, at a radially inner end thereof, an annular plate projecting portion 65C having a decreased axial thickness. The flange projecting portion 75C is arranged above the plate projecting portion 65C.

The flange projecting portion 75C preferably includes a cylindrical first flange surface 731C and a second flange surface 732C. The first flange surface 731C is arranged at an outer end portion of the flange projecting portion 75C, and is arranged to extend in the axial direction and face radially outward. The second flange surface 732C is an annular surface arranged to extend radially from the first flange surface 731C. The second flange surface 732C is a lower surface of the flange projecting portion 75C, and is located above the plate projecting portion 65C. The bearing cup portion 6C preferably includes a cylindrical first plate surface 611C and a second plate surface 623C. The first plate surface 611C is positioned opposite to the first flange surface 731C. The second plate surface 623C is an annular surface arranged to extend radially from the first plate surface 611C. The second plate surface 623C is an upper surface of the plate projecting portion 65C. The first flange surface 731C is preferably fitted to the first plate surface 611C through, for example, insertion fitting, press fitting, or shrink fitting. A first adhesive portion 81C, in which a first adhesive 91C is arranged, is preferably defined between the first flange surface 731C and the first plate surface 611C. According to the present preferred embodiment, there is preferably no gap defined between the first flange surface 731C and the first plate surface 611C. Absence of the gap contributes to reducing a displacement between a central axis of the shaft 7C and a central axis of the bearing cup portion 6C.

The second plate surface 623C is arranged axially opposite to at least a portion of the second flange surface 732C to define the lower thrust portion 17C. A second adhesive portion 82C, in which the first adhesive 91C is arranged, is preferably defined between the second plate surface 623C and the second flange surface 732C. Note that the second plate surface 623C may be either arranged opposite to the second flange surface 732C while being in contact with the second flange surface 732C, or arranged opposite to the second flange surface 732C with a gap intervening therebetween. The first adhesive 91C is preferably located continuously in the first adhesive portion 81C and the second adhesive portion 82C. Connection between the first adhesive portion 81C and the second adhesive portion 82C preferably contributes to improving the strength with which the flange portion 73C and the plate portion 62C are adhered to each other.

In addition, the flange portion 73C preferably includes a third flange surface 733C at an outer circumferential portion of the flange portion 73C. The third flange surface 733C preferably is cylindrical, and is arranged to extend in the axial direction and face radially outward. The plate portion 62C preferably includes a third plate surface 624C at an inner end portion of the plate portion 62C. The third plate surface 624C preferably is cylindrical, and is arranged to extend in the axial direction and face radially inward. The third flange surface 733C is positioned opposite to the third plate surface 624C. The third flange surface 733C is preferably fitted to the third plate surface 624C through, for example, insertion fitting, press fitting, or shrink fitting. A third adhesive portion 83C, in which the first adhesive 91C is arranged, is defined between the third flange surface 733C and the third plate surface 624C. The first adhesive 91C is preferably located continuously in the first adhesive portion 81C, the second adhesive portion 82C, and the third adhesive portion 83C. Note that the first adhesive 91C arranged in the first adhesive portion 81C, the first adhesive 91C arranged in the second adhesive portion 82C, and the first adhesive 91C arranged in the third adhesive portion 83C may not necessarily be continuous with one another. Also note that the adhesive arranged in the first adhesive portion 81C, the adhesive arranged in the second adhesive portion 82C, and the adhesive arranged in the third adhesive portion 83C may be different types of adhesives.

According to the present preferred embodiment, the plate projecting portion 65C is preferably configured to absorb and withstand an axial load below the flange projecting portion 75C. That is, the plate projecting portion 65C and the flange projecting portion 75C are arranged to axially overlap with each other in a plan view to define the lower thrust portion 17C. The strength with which the shaft 7C and the bearing cup portion 6C are fixed to each other is improved by the lower thrust portion 17C in addition to adhesive strength of the first adhesive portion 81C, the second adhesive portion 82C, and the third adhesive portion 83C. In addition, a fourth adhesive portion 84C, in which a fourth adhesive 94C is arranged, is preferably defined between an outer circumferential surface of the cylindrical wall 61C and an inner circumferential surface of a stator fixing portion 212C. A load imposed by a rotating portion 122C is absorbed by the fourth adhesive portion 84C as well. The fourth adhesive portion 84C is configured to have an axial dimension greater than a sum of the axial dimension of the first adhesive portion 81C and the axial dimension of the third adhesive portion 83C. Accordingly, the lower thrust portion 17C is able to obtain sufficient fixing strength to absorb and withstand the load imposed by the rotating portion 122C.

In addition, according to the present preferred embodiment, the flange projecting portion 75C is positioned above the plate projecting portion 65C. Note that the positions of the flange projecting portion 75C and the plate projecting portion 65C are not limited to those according to the present preferred embodiment. The flange projecting portion may be arranged below the plate projecting portion.

Figure 8:
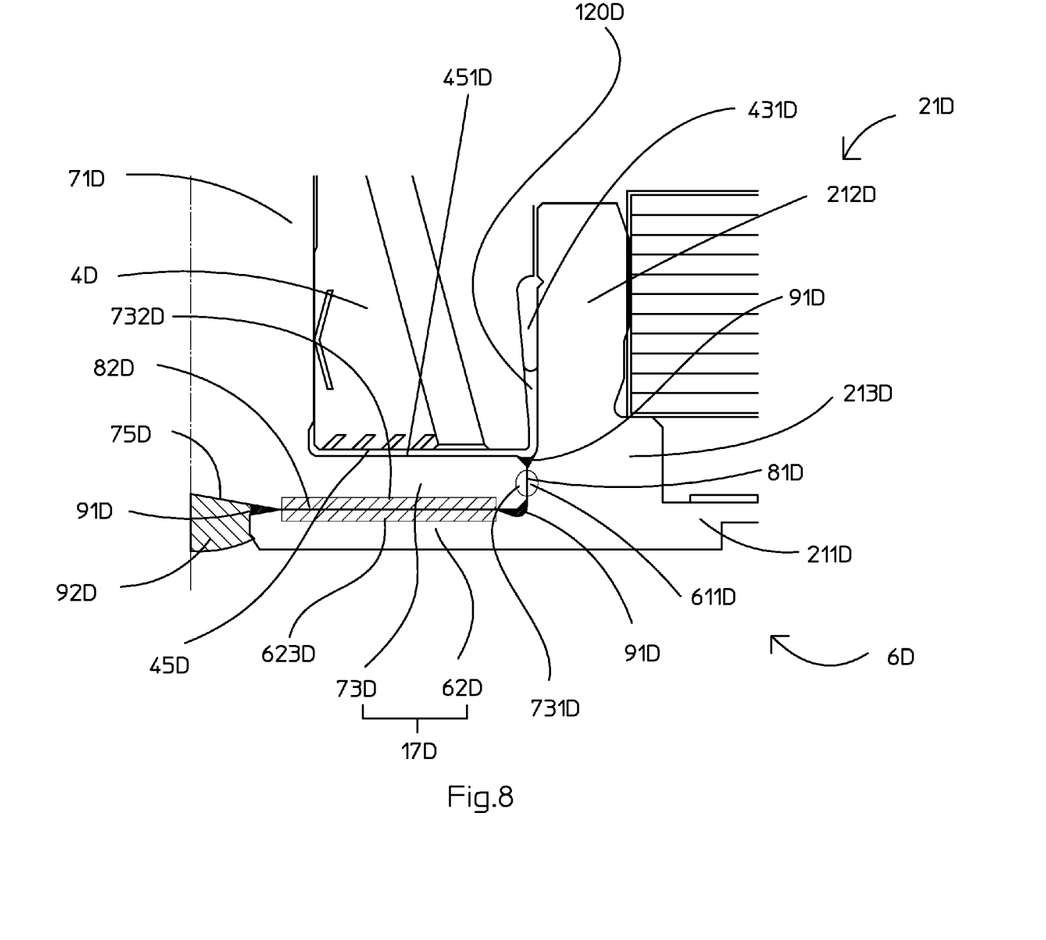
FIG. 8 is a diagram illustrating a lower thrust portion according to a fourth preferred embodiment of the present invention.

FIG. 8 is a diagram illustrating a lower thrust portion 17D according to a fourth preferred embodiment of the present invention. Because the fourth preferred embodiment illustrated in FIG. 8 is similar in basic structure to the first preferred embodiment, the same reference characters as in the first preferred embodiment will be used in FIG. 8 except that a "D" will be added to the end of the reference characters. The differences from the first preferred embodiment will be described below. Referring to FIG. 8, a bearing cup portion 6D is preferably defined integrally with a base plate 21D as a single monolithic member. The base plate 21D includes a plate portion 62D in the shape of a circular or annular plate and arranged to extend radially inward from a stator fixing portion 212D. A flange portion 73D is arranged above the plate portion 62D.

The flange portion 73D preferably includes a first flange surface 731D and a second flange surface 732D. The first flange surface 731D is a cylindrical surface arranged to extend in the axial direction and face radially outward. The second flange surface 732D is a circular or annular surface arranged to extend radially from the first flange surface 731D. The base plate 21D includes a first plate surface 611D arranged opposite to the first flange surface 731D, and a second plate surface 623D. The second plate surface 623D is a circular or annular surface arranged to extend radially from the first plate surface 611D.

The first flange surface 731D is fitted to the first plate surface 611D through, for example, insertion fitting, press fitting, or shrink fitting. A first adhesive portion 81D, in which a first adhesive 91D is arranged, is defined between the first flange surface 731D and the first plate surface 611D. In addition, the second plate surface 623D is arranged axially opposite to at least a portion of the second flange surface 732D to define the lower thrust portion 17D. A second adhesive portion 82D, in which the first adhesive 91D is arranged, is defined between the second plate surface 623D and the second flange surface 732D. Note that the second plate surface 623D may be either positioned opposite to the second flange surface 732D while being in contact with the second flange surface 732D, or positioned opposite to the second flange surface 732D with a gap intervening therebetween. The first adhesive 91D is preferably provided continuously in the first adhesive portion 81D and the second adhesive portion 82D. Connection between the first adhesive portion 81D and the second adhesive portion 82D preferably contributes to improving the strength with which the flange portion 73D and the plate portion 62D are adhered to each other. Since the bearing cup portion 6D and the base plate 21D are defined integrally with each other, a sturdier structure is achieved than in the case where the outer circumferential surface of the bearing cup portion and the inner circumferential surface of the stator fixing portion are adhered and fixed to each other.

According to the present preferred embodiment, an oil seal portion 431D is preferably defined between an outer circumferential surface of a sleeve portion 4D and the inner circumferential surface of the stator fixing portion 212D. A lubricant 120D is located in the oil seal portion 431D. Note that the oil seal portion 431D may alternatively be defined between the outer circumferential surface of the sleeve portion 4D and, instead of the inner circumferential surface of the stator fixing portion 212D, another member arranged on the inner circumferential surface of the stator fixing portion 212D.

In each of the above-described preferred embodiments, it is preferable that the outer circumferential surface of the shaft portion and the upper surface of the flange portion of the shaft are subjected to a grinding process at the same time. The outer circumferential surface of the shaft portion is preferably arranged opposite to the inner circumferential surface of the sleeve portion including the plurality of dynamic pressure grooves with the lubricant intervening therebetween to define a radial dynamic pressure bearing. Further, the upper surface of the flange portion is arranged opposite to the lower surface of the sleeve portion including the plurality of dynamic pressure grooves with the lubricant intervening therebetween to define a thrust dynamic pressure bearing. Since both the outer circumferential surface of the shaft portion and the upper surface of the flange portion are arranged to define the dynamic pressure bearings, highly precise perpendicularity is required with respect to the outer circumferential surface of the shaft portion and the upper surface of the flange portion. Accordingly, the outer circumferential surface of the shaft portion and the upper surface of the flange portion are ground at the same time to achieve high precision in the process.

Note that dynamic pressure grooves defined at the upper thrust gap may be a collection of grooves arranged in the spiral pattern or the herringbone pattern in each of the above-described preferred embodiments. Also note that the dynamic pressure grooves defined at the lower thrust gap may be a collection of grooves arranged in the herringbone pattern.

Note that the dynamic pressure grooves may not necessarily be defined at the upper thrust gap in each of the above-described preferred embodiments. In the case where the dynamic pressure grooves are not defined at the upper thrust gap, the bearing mechanism 123 is able to stably support the rotating portion 122 in a thrust direction by arranging a magnetic center of the stator 22 at a level lower than that of a magnetic center of the rotor magnet 32.

Note that the rotor hub 31 may be defined by, for example, press working or a cutting process in each of the above-described preferred embodiments. Also note that a surface of the rotor hub 31 may be subjected to, for example, electrolytic nickel plating, electroless nickel plating, or the like.

Note that the bearing mechanism 123 may be used in an inner-rotor motor, in which a rotor magnet is arranged radially inside a stator.

Features of the above-described preferred embodiments and the modifications thereof may be combined appropriately as long as no conflict arises.

Preferred embodiments of the present invention are applicable to motors of disk drive apparatuses, and are also applicable to motors of apparatuses other than the disk drive apparatuses.

In addition, motors according to preferred embodiments of the present invention may be used not only in the disk drive apparatuses but also in a variety of other electronic equipment, such as fans.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stationary portion including a base portion, a bearing cup portion, a shaft, and a stator; and
a rotating portion including a sleeve portion, a rotor hub extending radially outward from the sleeve portion, and a rotor magnet fixed to the rotor hub; wherein
the shaft includes a shaft portion and a flange portion extending radially outward from an outer circumferential surface of the shaft portion;
the sleeve portion includes a bearing hole configured to accommodate at least a portion of the shaft;
the bearing cup portion includes a cylindrical wall surrounding an outer circumference of the sleeve portion, and a plate portion in a shape of a circular or annular plate and extending radially inward from an inner circumferential surface of the cylindrical wall;
the flange portion includes a first flange surface which is a cylindrical surface extending in an axial direction and facing radially outward, and a second flange surface which is a circular or annular surface extending radially from the first flange surface;
the plate portion includes a first plate surface which is a cylindrical surface extending in the axial direction and facing radially inward, and a second plate surface which is a circular or annular surface extending radially from the first plate surface;
the first flange surface and the first plate surface are positioned opposite to each other to define a first adhesive portion, the first adhesive portion including an adhesive therein;
the second flange surface and the second plate surface are positioned opposite to each other to define a second adhesive portion, the second adhesive portion including an adhesive therein;
the adhesive in the first adhesive portion is continuous with the adhesive in the second adhesive portion; and
the first plate surface extends axially upward higher than the second plate surface and towards an axial middle portion of the shaft.

2. The motor according to claim 1, wherein
the second flange surface is located above the second plate surface;
the first flange surface is located at an outer end portion of the flange portion; and
the second adhesive portion is positioned between the second flange surface and the second plate surface.

3. The motor according to claim 2, wherein
the first flange surface and the first plate surface together define a first tapered portion therebetween, the first tapered portion including an adhesive therein; and
the adhesive in the first tapered portion is continuous with the adhesive in the first adhesive portion.

4. The motor according to claim 3, wherein
the plate portion includes a through hole around a central axis;
an inner end portion of the plate portion and a bottom portion of the shaft together define a second tapered portion therebetween, the second tapered portion including an adhesive therein; and
the adhesive located in the second tapered portion is continuous with the adhesive in the second adhesive portion.

5. The motor according to claim 4, further comprising an additional adhesive covering the inner end portion, the bottom portion, and the adhesive in the second tapered portion.

6. The motor according to claim 2, wherein
the plate portion includes a through hole around a central axis;
an inner end portion of the plate portion and a bottom portion of the shaft together define a second tapered portion therebetween, the second tapered portion including an adhesive therein; and
the adhesive in the second tapered portion is continuous with the adhesive in the second adhesive portion.

7. The motor according to claim 2, wherein
in the shaft, the outer circumferential surface of the shaft portion and an upper surface of the flange portion are made of materials that have been grounded simultaneously, the outer circumferential surface of the shaft portion extends in the axial direction, and the upper surface of the flange portion extends radially;
the outer circumferential surface of the shaft portion is opposite to an inner circumferential surface of the bearing hole with a lubricant intervening therebetween to define a radial dynamic pressure bearing, the inner circumferential surface of the bearing hole including a plurality of dynamic pressure grooves; and
the upper surface of the flange portion is opposite to a lower surface of the sleeve portion with the lubricant intervening therebetween to define a thrust dynamic pressure bearing, the lower surface of the sleeve portion including a plurality of dynamic pressure grooves.

8. The motor according to claim 2, wherein
the base portion includes a stator fixing portion to which the stator is fitted;
an inner circumferential surface of the stator fixing portion and an outer circumferential surface of the cylindrical wall together define an additional adhesive portion therebetween; and
the additional adhesive portion has an axial dimension greater than an axial dimension of the first adhesive portion.

9. The motor according to claim 1, wherein
the second plate surface is located above the second flange surface;
the first plate surface is located at an inner end portion of the plate portion; and
the second adhesive portion is located between the second flange surface and the second plate surface.

10. The motor according to claim 9, wherein
the first plate surface and the first flange surface together define a first tapered portion therebetween, the first tapered portion including an adhesive therein;
an outer end portion of the flange portion and a bottom portion of the bearing cup portion together define a second tapered portion therebetween, the second tapered portion including an adhesive therein;
the adhesive in the first tapered portion is continuous with the adhesive in the first adhesive portion; and
the adhesive in the second tapered portion is continuous with the adhesive in the second adhesive portion.

11. The motor according to claim 10, further comprising an additional adhesive positioned to cover the outer end portion, the bottom portion, and the adhesive located in the second tapered portion.

12. The motor according to claim 9, wherein
the base portion includes a stator fixing portion to which the stator is fitted;
an inner circumferential surface of the stator fixing portion and an outer circumferential surface of the cylindrical wall together define an additional adhesive portion therebetween; and
the additional adhesive portion has an axial dimension greater than an axial dimension of the first adhesive portion.

13. The motor according to claim 1, wherein
the flange portion includes an annular flange projecting portion that projects radially outward;
the plate portion includes an annular plate projecting portion that projects radially inward;
the second flange surface is located above the plate projecting portion;
the first flange surface is located at an outer end portion of the flange projecting portion; and
the second adhesive portion is located between the second flange surface and the second plate surface.

14. The motor according to claim 13, wherein
the flange portion includes a third flange surface at an outer circumferential portion thereof;
the plate portion includes a third plate surface at an inner end portion thereof;
the third flange surface and the third plate surface are opposite to each other to define a third adhesive portion;
the third adhesive portion includes an adhesive therein; and
the adhesive in the third adhesive portion is continuous with the adhesive in the second adhesive portion.

15. The motor according to claim 14, wherein
in the shaft, the outer circumferential surface of the shaft portion and an upper surface of the flange portion are made of materials that have been grounded simultaneously, the outer circumferential surface of the shaft extends in the axial direction, and the upper surface of the flange portion extends radially;
the outer circumferential surface of the shaft portion is opposite to an inner circumferential surface of the bearing hole with a lubricant intervening therebetween to define a radial dynamic pressure bearing, the inner circumferential surface of the bearing hole including a plurality of dynamic pressure grooves; and
the upper surface of the flange portion is opposite to a lower surface of the sleeve portion with the lubricant intervening therebetween to define a thrust dynamic pressure bearing, the lower surface of the sleeve portion including a plurality of dynamic pressure grooves.

16. The motor according to claim 14, wherein
the base portion includes a stator fixing portion to which the stator is fitted;
an inner circumferential surface of the stator fixing portion and an outer circumferential surface of the cylindrical wall together define an additional adhesive portion therebetween; and
the additional adhesive portion has an axial dimension greater than a sum of an axial dimension of the first adhesive portion and an axial dimension of the third adhesive portion.

17. The motor according to claim 1, wherein
the base portion and the bearing cup portion are integral with each other to define a single monolithic member; and
the base portion includes the plate portion and a stator fixing portion to which the stator is fitted, the plate portion being circular or annular and extending radially inward from the stator fixing portion.

18. A disk drive apparatus comprising:
the motor according to claim 1, the motor being configured to rotate a disk;
an access portion configured to perform at least one of reading and writing of information from or to the disk; and
a housing configured to accommodate the disk, the motor, and the access portion.

19. Electronic equipment comprising the motor according to claim 1.

20. Electronic equipment comprising the disk drive apparatus according to claim 18.

* * * * *